US011487895B2

(12) United States Patent
Sunkavally et al.

(10) Patent No.: US 11,487,895 B2
(45) Date of Patent: Nov. 1, 2022

(54) CLIENT-SIDE ENCRYPTION AND PROCESSING OF TELEMETRY DATA

(71) Applicant: EMC IP Holding Company LLC, Hopkinton, MA (US)

(72) Inventors: Naveen Sunkavally, Cary, NC (US); Sashka T. Davis, Vienna, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 284 days.

(21) Appl. No.: 16/728,444

(22) Filed: Dec. 27, 2019

(65) Prior Publication Data
US 2021/0200890 A1 Jul. 1, 2021

(51) Int. Cl.
| | |
|---|---|
| G06F 21/62 | (2013.01) |
| G06Q 30/02 | (2012.01) |
| G06F 21/64 | (2013.01) |
| G06F 16/9035 | (2019.01) |

(52) U.S. Cl.
CPC ...... *G06F 21/6227* (2013.01); *G06F 16/9035* (2019.01); *G06F 21/64* (2013.01); *G06Q 30/0201* (2013.01)

(58) Field of Classification Search
CPC .. G06F 21/6227; G06F 16/9035; G06F 21/64; G06F 21/6254; G06Q 30/0201
See application file for complete search history.

(56) References Cited

U.S. PATENT DOCUMENTS

| | | | | |
|---|---|---|---|---|
| 9,608,810 | B1 * | 3/2017 | Ghetti | H04L 63/0428 |
| 10,803,197 | B1 * | 10/2020 | Liao | G06F 21/604 |
| 2008/0133531 | A1 * | 6/2008 | Baskerville | G06F 21/6254 |
| | | | | 707/999.009 |
| 2012/0254320 | A1 * | 10/2012 | Dove | G16H 40/67 |
| | | | | 709/204 |
| 2016/0246996 | A1 * | 8/2016 | Khoo | G06F 21/6245 |

(Continued)

OTHER PUBLICATIONS

What Exactly is Client-Side Encryption? Information Security Stack Exchange, https://security.stackexchange.com/questions/176376/what-exactly-is-client-side-encryption, Dec. 30, 2017.

(Continued)

*Primary Examiner* — Meng Li
(74) *Attorney, Agent, or Firm* — Ryan, Mason & Lewis, LLP

(57) ABSTRACT

Techniques are provided for client-side encryption and/or processing of telemetry data. An illustrative method comprises providing, by a telemetry server, a query request to a telemetry client, wherein the provided query request comprises a query and an encrypted payload over which the query operates; obtaining a query result from the telemetry client, wherein the telemetry client (a) decrypts the encrypted payload using at least one decryption key, (b) processes the query request using the decrypted payload, and (c) provides the query result to the telemetry server; and aggregating the query results obtained from one or more of the telemetry clients. The telemetry client can (i) validate the decrypted payload using a signature within the decrypted payload, and/or (ii) evaluate a query type of the query to determine whether the telemetry client opted in to the query type being executed.

20 Claims, 6 Drawing Sheets

(56) References Cited

U.S. PATENT DOCUMENTS

2019/0158594 A1* 5/2019 Shadmon ............ G06F 16/2471
2020/0302564 A1* 9/2020 Varga ................ G06F 16/24578

OTHER PUBLICATIONS

GitHut, Cossacklabs/acra: Database Security Suite for Data-Driven Apps: Database Proxy with Strong selective Encryption, Search Through Encrypted Data, SQL Injections Prevention, Intrusion Detection, Honeypots. Supports Client-Side and Proxy-Side Encryption Works for SQL Databases and (limited functionality) for NoSQL databases. https://www.cossacklabs.com/acra/ May 26, 2019.

* cited by examiner

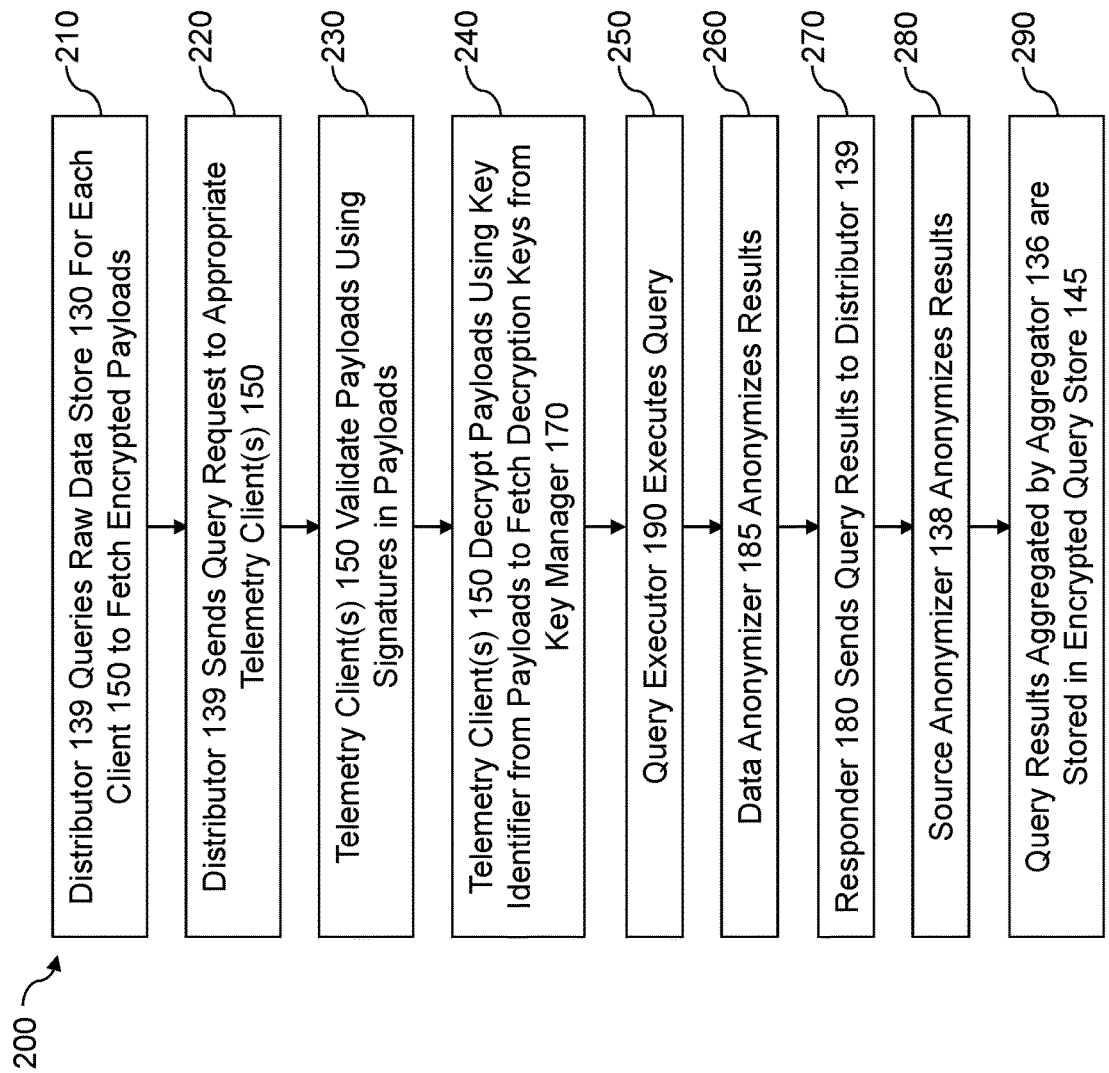

| Data Type (Class) | Considered Sensitive | Encryption | Storage | Query Processing | Retention Interval |
|---|---|---|---|---|---|
| Data Type A (User Does not Opt-In) | N/A | Server-Side | Server | Server-Side | Indefinite |
| Data Type B | No | Server-Side | Server | Server-Side | Indefinite |
| Data Type C | No | Client-Side or None | Client | Client-Side | Based on Client Storage Limits But Likely Small (e.g., 7 Days) |
| Data Type D | Yes | Client-Side | Server | Client-Side | Client-Determined based on How Long Keys are Retained |

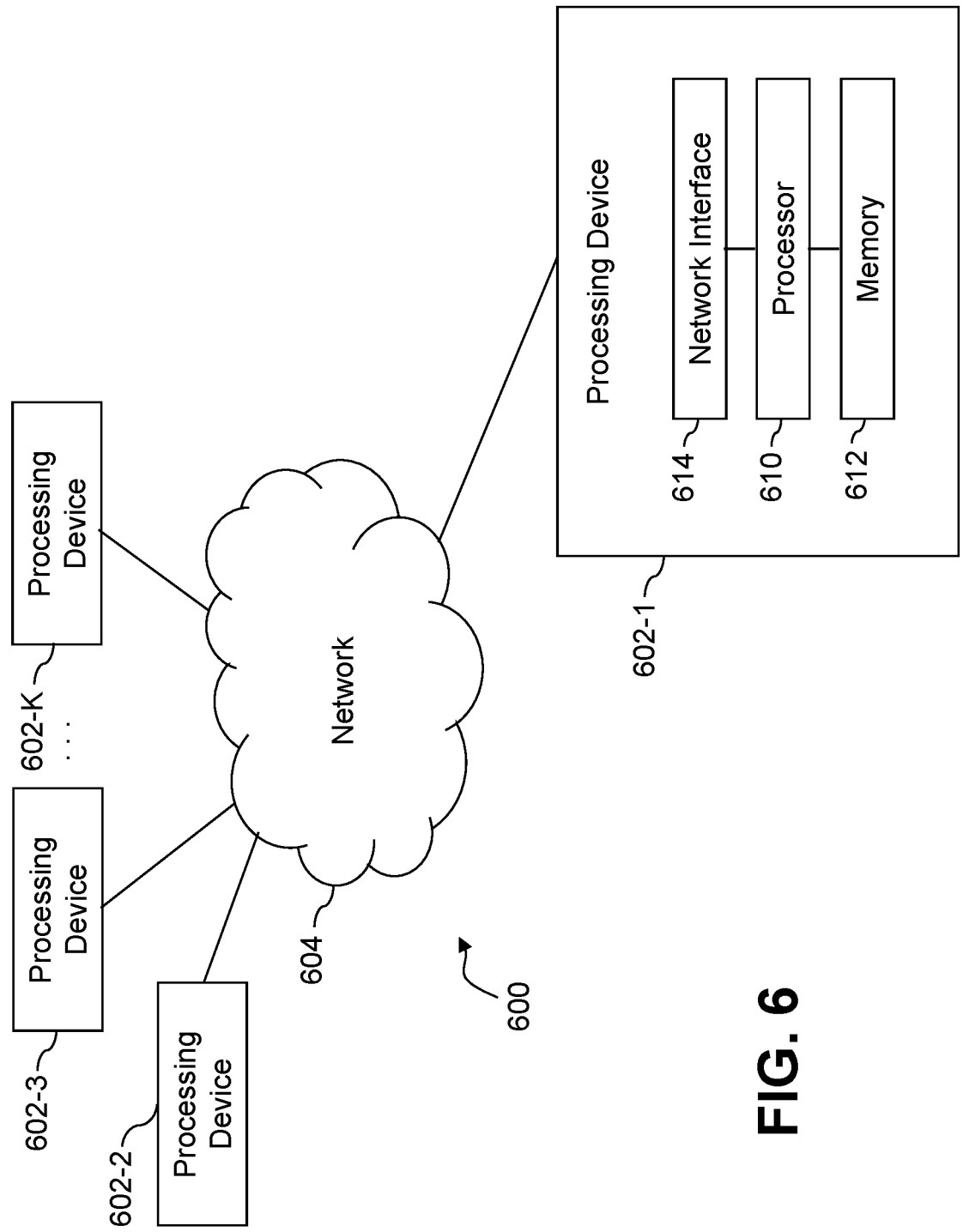

CLIENT-SIDE ENCRYPTION AND PROCESSING OF TELEMETRY DATA

FIELD

The field relates generally to the processing of telemetry data.

BACKGROUND

Telemetry is a common feature that enables vendors to gain insights into the behavior of their users and the performance of their products or services. In a standard telemetry model, users opt in to allow user and product data to be collected, and the collected data is sent to a telemetry service where the collected data is anonymized, analyzed, and used by vendors to obtain insights. This telemetry model, however, is not user friendly as it requires users to place a significant amount of trust in how vendors collect and handle the user data. In addition, the standard telemetry model is not well suited for cases where users want to opt out and have their data purged (e.g., by invoking their right-to-be-forgotten under the General Data Protection Regulation (GDPR) of the European Union).

Such a high trust barrier makes it more likely that users will not opt in to having their telemetry data collected. When users do opt in, they are more likely to only allow a small portion of the possible data to be collected, ultimately limiting the value that vendors can gain from telemetry data.

A need therefore exists for improved techniques for collecting and processing telemetry data.

SUMMARY

In one embodiment, a method comprises providing, by a telemetry server, a query request to one or more telemetry clients, wherein the provided query request comprises a query and one or more encrypted payloads over which the query operates; obtaining a query result from one or more of the telemetry clients, wherein at least one telemetry client (a) decrypts the one or more encrypted payloads using at least one decryption key, (b) processes the query request using the one or more decrypted payloads, and (c) provides the query result to the telemetry server; and aggregating the query results obtained from the one or more telemetry clients.

In some embodiments, the at least one telemetry client (i) validates the one or more decrypted payloads using one or more signatures within the one or more decrypted payloads, and/or (ii) evaluates a query type of the query to determine whether the at least one telemetry client opted in to the query type being executed.

Other illustrative embodiments include, without limitation, apparatus, systems, methods and computer program products comprising processor-readable storage media.

BRIEF DESCRIPTION OF THE DRAWINGS

FIG. 2 is a flow chart illustrating an exemplary implementation of a query execution process, according to at least one embodiment;

FIG. 3 is a sample table indicating different ways of capturing and processing telemetry data in a hybrid telemetry environment, according to some embodiments;

FIG. 6 illustrates another exemplary processing platform that may be used to implement at least a portion of one or more embodiments of the disclosure.

DETAILED DESCRIPTION

Figure 1:
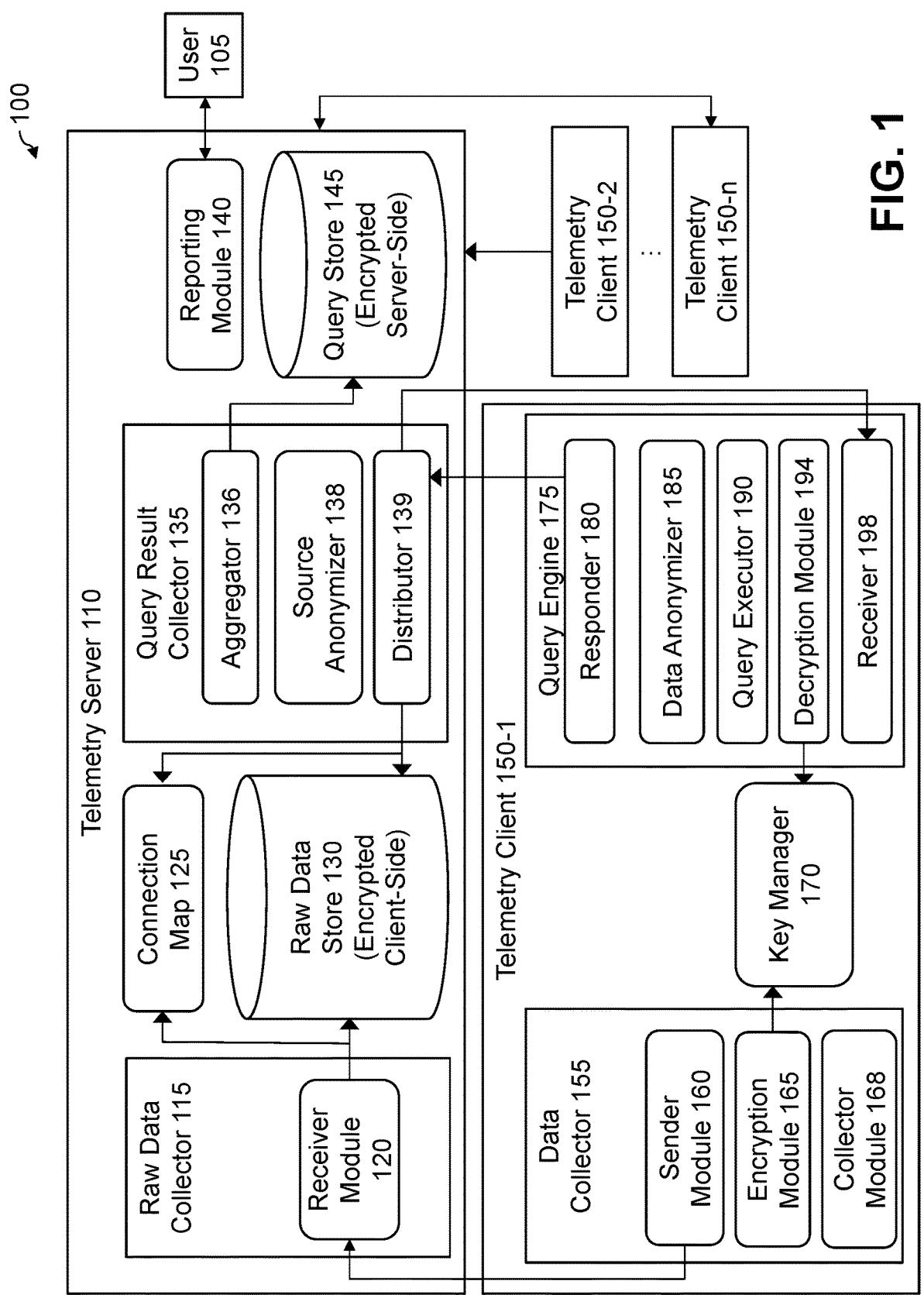
FIG. 1 illustrates an exemplary telemetry environment that employs client-side encryption of telemetry data, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for client-side encryption and/or processing of telemetry data.

In one or more embodiments, improved techniques are provided for collecting and/or processing telemetry data that leverage client-side encryption to provide users with more control over their data and how the data is used. The disclosed techniques for client-side encryption of telemetry data provide a better assurance that user data has been removed (or at least cannot be accessed) when users choose to opt out. Among other benefits, the disclosed telemetry system does not require users to place blind trust in vendors, since trust is enforced by design. As a result, users may be more likely to opt in for telemetry data collection, providing higher value to vendors. The disclosed telemetry system also helps vendors to meet their compliance obligations.

The disclosed telemetry data system is well suited, for example, for cases when telemetry data is being collected from "always connected" appliances or software capable of maintaining persistent connections to the Internet. As such, the disclosed telemetry data system can work well for many on-premises enterprise products, such as the RSA Netwitness® threat detection and response system, commercially available from Dell EMC of Hopkinton, Mass., or Internet of Things (IoT) edge gateway devices.

Among other benefits, the disclosed techniques for client-side encryption of telemetry data allow vendors to collect data in advance, even when they may not recognize all of the ways that they can ultimately use the collected data.

As noted above, in a standard telemetry model, users opt in to allow user and product data to be collected, and the collected data is sent to a telemetry service where the collected data is anonymized, analyzed, and used by vendors. Users may be given an option to choose the kinds of collected data. Telemetry clients collect this data locally and send it to a remote telemetry service. To bypass firewall issues, clients typically initiate the connections to the telemetry service.

A typical telemetry service anonymizes the data, typically through hashing or tokenization, to remove any reference to the source from which data is being collected and to remove any sensitive information in the data such as personally identifiable information, for example. Data is encrypted server-side (e.g., using keys known to the telemetry service) and stored. Subsequently, data is analyzed and queried to create reports that provide insights to a vendor.

From the perspective of a user, the standard telemetry architecture suffers from the following issues:

users must blindly trust that the telemetry client is only collecting the appropriate telemetry data;

once data is sent to the telemetry service, users lose control of the data (and must blindly trust that vendors are handling their data correctly, e.g., anonymizing and encrypting the collected telemetry data correctly and not sharing it with other third parties); and if a user later decides to opt out and have his or her data purged, there is no assurance that the vendor has actually removed the data.

The standard telemetry architecture thus does not facilitate trust between users and vendors. As a result, users are less likely to opt in at all for data collection, and even if the users do opt in, they are more likely to only allow a small amount of information to be collected. This ultimately hurts vendors with good intentions from gaining insights that could be used to provide better products and services for their users.

The standard telemetry architecture also imposes a significant compliance burden on vendors to meet regulations for GDPR and handling personally identifiable information.

FIG. 1 illustrates an exemplary telemetry environment 100 that employs client-side encryption of telemetry data, according to one embodiment of the disclosure. As noted above, the disclosed telemetry environment 100 may be employed, for example, when telemetry data are collected from always-connected devices or software.

As shown in FIG. 1, the exemplary telemetry environment 100 comprises a telemetry server 110 of a telemetry service and a plurality of telemetry clients 150-1 through 150-n (collectively referred to herein as telemetry clients 150). In the notation of FIG. 1, the direction of the arrows represents the logical flow of data. Telemetry clients 150 initiate outbound connections to the telemetry server 110, and data are exchanged over these connections. These connections are typically long-lived and over a secure channel (for instance, web sockets over HTTPS (Hyper Text Transfer Protocol Secure)). When a connection is broken, the telemetry client 150 should retry connecting to the telemetry server 110 until it is successful.

As discussed further below, in some embodiments, usage restrictions for the collected telemetry data are expressed as queries defined by the telemetry server 110. It is noted, however, that the collected telemetry data can be much richer than the queries the user has opted in for during a setup phase, as discussed below.

As shown in FIG. 1, the exemplary telemetry server 110 comprises a raw data collector 115, a connection map 125, a raw data store 130, a query result collector 135, a reporting module 140, and a query store 145. The exemplary raw data collector 115 comprises a receiver module 120 that receives collected telemetry data from the telemetry clients 150.

As discussed further below, the connection map 125 can be implemented, for example, as an in-memory connection map that enables the telemetry server 110 to call back to telemetry clients 150 to execute queries.

The exemplary raw data store 130 stores telemetry data that were encrypted by the respective telemetry client 150. In some embodiments, client payloads are directly saved into the raw data store 130 after a signature validation.

The exemplary query result collector 135 comprises an aggregator 136, a source anonymizer 138 and a distributor 139. The aggregator 136 aggregates query results from the telemetry clients 150 and the aggregated query results are stored in a query store 145, which is encrypted server-side by the telemetry server 110.

The exemplary source anonymizer 138 anonymizes the source of query results. The exemplary distributor 139 dispatches queries for the telemetry server 110 to telemetry clients 150. For each telemetry client 150, the distributor 139 queries the raw data store 130 to fetch a set of encrypted payloads.

The exemplary reporting module 140 makes query results available to one or more vendors (users) 105.

As shown in FIG. 1, the exemplary telemetry clients 150, such as representative telemetry client 150-1, comprises a data collector 155, a key manager 170, and a query engine 175. The exemplary data collector 155 comprises a sender module 160, an encryption module 165, and a collector module 168.

The exemplary sender module 160 sends the collected telemetry data to the receiver module 120 of the telemetry server 110, as noted above. The exemplary encryption module 165 encrypts and signs collected telemetry data, client-side, using the appropriate encryption keys from the key manager 170.

The exemplary collector module 168 performs the collection of the telemetry data, in accordance with the types of data that the respective telemetry clients 150 has opted in for collection.

Generally, the key manager 170 maintains a map of key identifiers for keys and key metadata, as discussed further below.

The exemplary query engine 175 comprises a responder 180, a data anonymizer 185, a query executor 190, a decryption module 194, and a receiver 198. As shown in FIG. 1, a query is received at one of the telemetry clients 150 by the receiver 198, and the payloads are initially validated using the signatures that are part of the payloads. The query type is also checked to make sure the client has opted in to that query being executed. Then, the payloads are decrypted by decryption module 194, using the key identifier stored with the payloads to fetch the right decryption keys from the key manager 170. The query executor 190 executes the query, and the results are anonymized by the data anonymizer 185 to remove sensitive information. Finally, the telemetry clients 150 send the query results to the telemetry server 110 using the responder 180.

Initially, users associated with the telemetry clients 150 opt in to the type of data that is collected, as well as how the collected data is used. In some embodiments, data usage parameters are expressed as queries defined by the telemetry server 110 that can be readily translated to a query language such as SQL or HiveQL. Data usage typically maps to the type of reports that a vendor is ultimately trying to get out of the telemetry data.

In the context of a threat detection and response system, such as the RSA Netwitness® threat detection and response system, for example, representative queries could be:

features used, grouped by user role, over the last month; and number of incidents, grouped by severity and assignee role, over the last day.

In the context of an IoT gateway, for example, representative queries could be:

number of connected IoT devices, grouped by protocol, over the last day;

maximum, minimum, average producer-consumer ratio statistic ("bytes in" versus "bytes out") for connected IoT devices, grouped by device type, over the last day; and average central processing unit (CPU), memory and/or network usage grouped by service, over the last hour.

In one or more embodiments, queries are ultimately executed client-side by the query engine 175 of the respective telemetry client 150, as discussed further below. As such, to build trust, the telemetry client codebase can be open-sourced and reviewed by the larger community. Since queries are executed locally by the telemetry client 150, the telemetry client 150 could also present an interface to the user that shows sample output from the queries using local data to give the user an idea of how sensitive the data really is.

At setup, clients also generate a persistent client UUID (universally unique identifier) (or another suitable identifier) and keys for encryption, decryption, and signing, within the key manager 170 component.

Data Collection

Telemetry data is collected by each telemetry client 150 based on the preferences of the respective user. Note that the collected telemetry data can be much richer than the queries that the user opted in for during a setup phase. For example, data can take the form of an event stream. This can be important as the vendor may not know all of the ways in which the vendor wants to use the data ahead of time, as discussed further below in a section entitled "Adding a New Query."

As noted above, the collected telemetry data is encrypted and signed client-side by the encryption module 165. The key manager 170 at the respective telemetry client 150 maintains a map of key identifiers to keys and key metadata. Telemetry clients 150 can choose the type of encryption and keys that they want to use. For instance, telemetry clients 150 can use a symmetric key for both encryption and decryption. In a further variation, telemetry clients 150 can generate a new symmetric key per payload, encrypt the symmetric keys with their public keys, and include the encrypted symmetric key with each payload, as would be apparent to a person of ordinary skill in the art. In this case, the key manager 170 provides access to the public and private keys of the client.

A representative final payload sent by a telemetry client 150 to the telemetry server 110 may take the following exemplary form:

[client_uuid, key_identifier, unprotected_meta, encrypted_payload, signature]

The unprotected_meta section comprises non-sensitive descriptive information about the payload, such as the type of data being collected, data schema, and/or version.

At the telemetry server 110, client payloads are directly saved into the raw data store 130 by the receiver module 120 after signature validation. In addition, the telemetry server 110 keeps the in-memory connection map 125 updated, represented as client_uuid=>client_connection_object. The connection map 125 enables the telemetry server 110 to call back to telemetry clients 150 to execute queries, as described below.

Query Execution

As noted above, queries are meant to directly correspond to reports desired by the vendor.

FIG. 2 is a flow chart illustrating an exemplary implementation of a query execution process 200, according to one embodiment of the disclosure. To generate a given report, queries are dispatched by the telemetry server 110 to one or more telemetry clients 150, using the distributor 139. For each telemetry client 150, the distributor 139 queries the raw data store 130 to fetch a set of encrypted payloads during step 210. The distributor 139 can use the unencrypted_meta and client_uuid attributes saved with the payloads to narrow down the search to minimize the number of payloads returned. The distributor 139 then sends a query request to the appropriate telemetry client(s) 150 during step 220. This query request comprises the query, query metadata, and the payloads over which the query will operate.

At the recipient telemetry client 150, the payloads are first validated during step 230 using the signatures that are part of the payloads. The query type is also checked to make sure the recipient telemetry client 150 has opted in to the query type being executed. Then, the payloads are decrypted by the decryption module 194 during step 240, using the key identifier stored with the payloads to fetch the right decryption keys from the key manager 170. The query executor 190 executes the query during step 250, and the results are anonymized by the data anonymizer 185 to remove any sensitive information during step 260. Last, the responder 180 of the recipient telemetry client 150 sends back the query results to the distributor 139 of the telemetry server 110 during step 270.

The source anonymizer 138 of the telemetry server 110 anonymizes the results during step 280 to remove any source-specific information, such as the client_uuid. Then, the query results are aggregated by the aggregator 136 and stored in the query store 145 during step 290, which is encrypted server-side, as noted above. The results are finally made available to the appropriate vendor(s) through the reporting module 140.

Optimization

From the perspective of a telemetry client 150, it is often desirable to minimize local resource utilization, especially CPU and network bandwidth. From the perspective of the telemetry server 110, it is often desirable to minimize the latency for getting aggregate query results. There are many optional approaches to address these issues, including:

- data compression prior to encryption at the telemetry clients 150;
- pre-computing query results at the telemetry clients 150 at the time the raw data are collected, and sending up both the query results and raw data together;
- spreading out query execution over time (for instance, executing once per day and rolling them up to get the results over a longer period of time);
- CPU and bandwidth throttling at the telemetry clients 150;
- using intermediate telemetry service aggregator nodes, deployed at edge locations close to telemetry clients 150; and
- sending queries only to telemetry clients 150 known ahead of time to have opted in to having those queries executed (e.g., by syncing configuration ahead of time).

Adding a New Query

Suppose at a point in the future, that a vendor would like to run new queries that the telemetry clients 150 have not seen before. For instance, perhaps a user is working with the vendor on a support request, and the vendor needs to obtain better visibility into what transpired on the client system. Alternatively, suppose that a professional services organization at the vendor would like to assist the user to do a "tune-up" to make sure that the vendor product is operating optimally. In another variation, perhaps the vendor is researching whether to develop a new feature, and the vendor would like to gauge using past and current user data if the feature would be useful.

A new query can be added by letting the vendor push the new query type and code associated with the query to at least some of the telemetry clients 150, and by asking users to opt in to having the new query executed on their telemetry clients 150. Users could optionally inspect the query code to gain trust that it is safe. Pushing new queries down to the clients can be done over the same communication channel established between the telemetry clients 150 and the telemetry server 110, or it can be performed using out-of-band communications.

Once the user opts in, queries can be executed using the same flow described in the section entitled "Query Execution."

Figure 4:
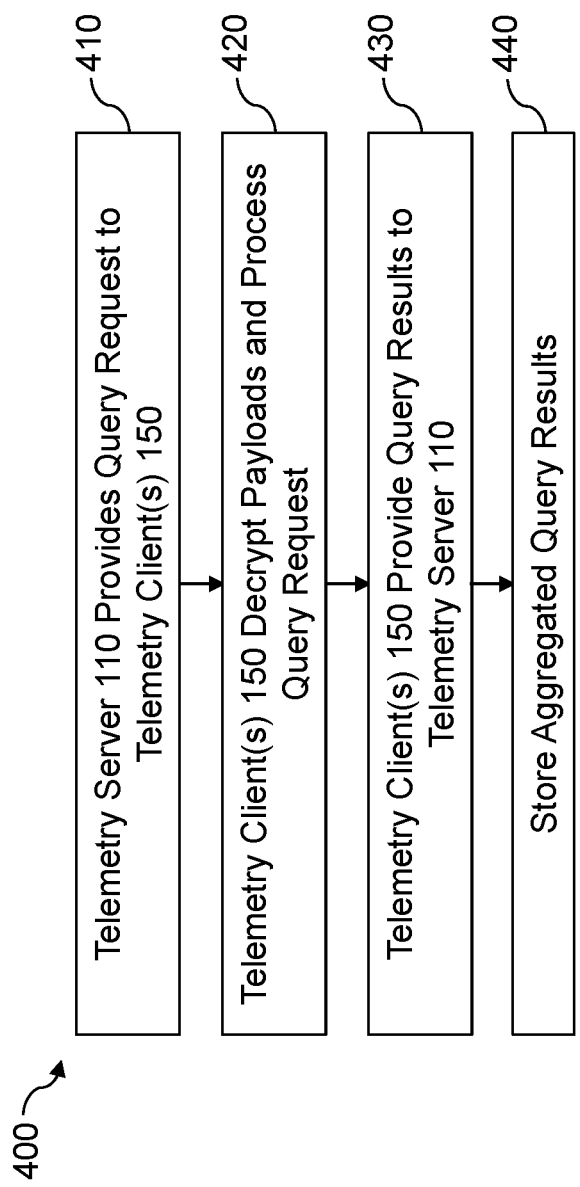
FIG. 4 is a flow chart illustrating an exemplary implementation of a telemetry data query process, according to an embodiment of the disclosure.

FIG. 4 is a flow chart illustrating an exemplary implementation of a telemetry data query process 400, according to an embodiment of the disclosure. As shown in FIG. 4, a query request is initially provided by the telemetry server 110 to one or more telemetry client(s) 150 during step 410. The provided query request comprises the query and one or more payloads over which the query will operate.

The one or more telemetry client(s) 150 decrypt the payloads and process the query request during step 420 and provides the query results to the telemetry server 110 during step 430. The payloads are decrypted in some embodiments using the key identifier stored with the payloads to fetch the appropriate decryption keys from the key manager 170. The source anonymizer 138 of the telemetry server 110 optionally anonymizes the results during step 280 to remove any source-specific information. Then, the query results are aggregated by the aggregator 136 and stored in the query store 145 during step 440, which is encrypted server-side, as noted above. The results can be made available to the appropriate vendor(s) through the reporting module 140. It is noted that the aggregation performed during step 440 can include an aggregation of one or more query results from a single telemetry client 150-*i*.

User Controls

Opting Out

Suppose that a user wants to opt out of telemetry data collection and have all of his or her data removed from the telemetry server 110. The user can put in a request with the telemetry server 110 to remove all data associated with his/her client_uuid. In addition, the user can discard all the keys at the respective telemetry client 150. Even if the telemetry server 110 does not follow through with the data removal request or is not able to completely purge the telemetry data of the user, the user can effectively make any remnants of his or her data useless to the telemetry server 110 by discarding the keys.

Key Management

Users can control how often keys are rotated at the respective telemetry client 150. Users can also discard keys older than an indicated time interval, effectively making it so that only data within the last n days, for example, can be retained by the telemetry server 110.

Hybrid Architecture

One variation of the above telemetry environment 100 is to use a hybrid approach where, in some embodiments, a first portion of the data is collected and processed using a standard server-side telemetry architecture, and a second portion of the data can be collected and processed using the disclosed client-side telemetry architecture. For example, for each data type being collected, as discussed further below in conjunction with FIG. 3, users can be given an option to use server-side telemetry processing or client-side telemetry processing. In this manner, users can trade off trust versus a usage of client-side resources to process the telemetry data.

FIG. 3 is a sample table 300 indicating different ways of capturing and processing telemetry data in a hybrid telemetry environment, according to some embodiments. For example, as shown in FIG. 3, for various indicated data types, a user can indicate whether client-side or server-side resources are used for encryption, storage and query processing. In addition, in some embodiments, the sample table 300 allows a retention interval to be specified by the client (and/or using default values).

Other Variations

In further variations of the disclosed techniques for client-side encryption of telemetry data, clients can optionally employ a TPM (telemetry environment) or trusted third party to manage keys and/or securely process data. In other words, the key manager 170 of FIG. 1 can be maintained by an entity other than the respective telemetry client 150. In addition, queues can optionally be introduced at the telemetry server 110 to support offline use cases when the client cannot maintain a persistent connection all the time, as would be apparent to a person of ordinary skill in the art.

In yet another variation, additional privacy preserving techniques can be employed, such as differential privacy, as used by, for example, Google and Apple in their telemetry data collection.

Among other benefits, the disclosed techniques for client-side encryption of telemetry data allow the user to understand and opt in as to how any collected telemetry data is used (and not just what is data is collected). In addition, users are provided with control over the deletion of raw data or keeping raw data for only a predefined duration, such as the last n days. Further, the disclosed techniques for client-side encryption of telemetry data allow users to inspect, audit, and gain trust in the code responsible for encryption, data anonymization and query execution.

For example, one or more aspects of the disclosure aim to allow a user to opt in without having to significantly invest in computational resources. Thus, the disclosed techniques for processing of telemetry data provide users with more control over the data while also incurring less expenses in setting up the infrastructure to opt in. In cases when the level of trust between user and provider is low, users or customers may decide to have full control over data and can set up the disclosed telemetry data collection architecture at the cost of computation performed by the customer. Depending on the trust relation, different degrees of control can be applied. This allows a tradeoff between a cost of opting-in and trust. For example, one implementation may be based on a combination between an existing "standard" telemetry server architecture and the disclosed telemetry data collection architecture with the goal of reducing customer cost and allowing collection of telemetry data. If a customer trusts a provider, then the customer can use the "standard" architecture for most of the data, however, if there is particularly sensitive information, then the customer can setup the disclosed telemetry data collection architecture in a small scale (e.g., with few resources) only for the sensitive data. With this alternate implementation, the telemetry service has complete access to telemetry data yet allows flexible distribution of load based on trust.

Thus, in some embodiments, the disclosed techniques for client-side encryption and processing of telemetry data provide users more control and confidence with respect to the collection of telemetry data.

From the perspective of a vendor, the disclosed techniques for client-side encryption of telemetry data make it easier to meet compliance regulations (such as GDPR, for example) or regulations related to handling of personally identifiable information. Additionally, the disclosed techniques provide flexibility to collect a rich set of telemetry data up front, without having to know all of the questions that the vendor wants answered ahead of time, as vendors can ask users to opt-in to new queries later on. Further, since it is easier for users to trust the disclosed telemetry data collection system, more users may opt in to having their data collected.

One or more embodiments of the disclosure provide improved methods, apparatus and computer program products for client-side encryption and/or processing of telemetry data. The foregoing applications and associated embodiments should be considered as illustrative only, and numerous other embodiments can be configured using the techniques disclosed herein, in a wide variety of different applications.

It should also be understood that the disclosed telemetry data collection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for client-side encryption and/or processing of telemetry data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based telemetry data processing engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based telemetry data processing platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
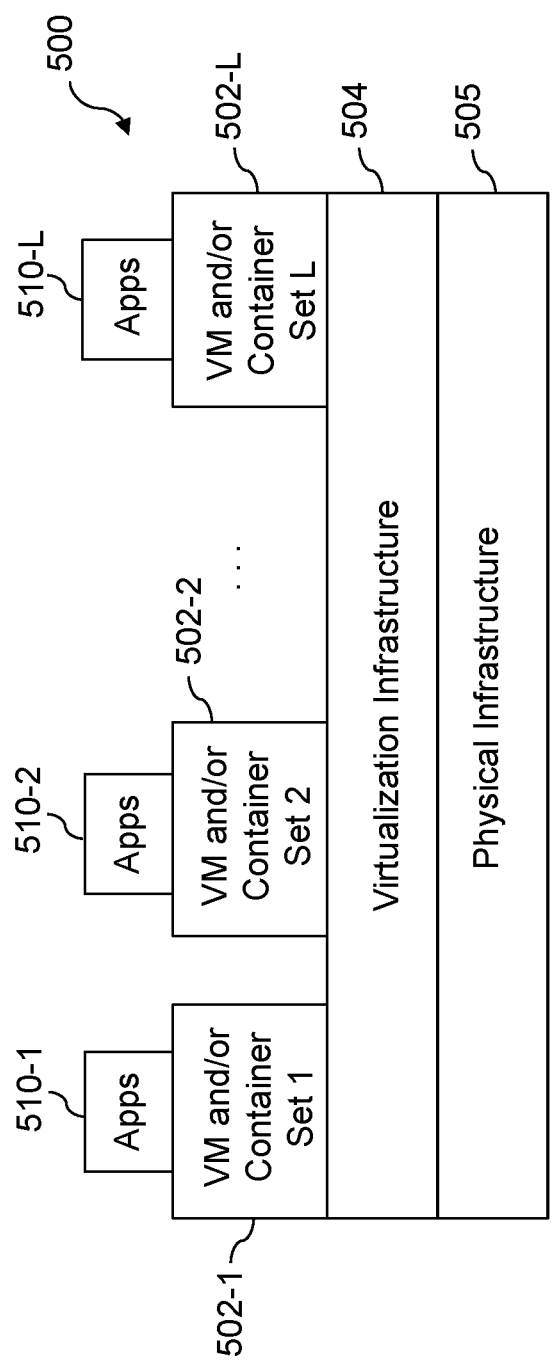
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the telemetry environment 100 of FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide telemetry data collection functionality of the type described above for one or more processes running on a given one of the VMs. For example, each of the VMs can implement telemetry data collection control logic and associated key management functionality for providing client-side encryption of telemetry data for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide telemetry data collection functionality of the type described above for one or more processes running on different ones of the containers. For example, a container host device supporting multiple containers of one or more container sets can implement one or more instances of data collection control logic and associated key management functionality for providing client-side encryption of telemetry data.

As is apparent from the above, one or more of the processing modules or other components of telemetry environment 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
providing, by a telemetry server, a query request to one or more telemetry clients that collect telemetry data, wherein the provided query request comprises a query and one or more encrypted payloads of the query over which the query operates;
obtaining a query result from one or more of the telemetry clients, wherein at least one of the telemetry clients processes the query request by performing the following steps: (a) decrypting the one or more encrypted payloads using at least one decryption key, (b) applying the query to the one or more decrypted payloads to generate the query result, and (c) providing the query result to the telemetry server; and
aggregating the query results obtained from the one or more telemetry clients;

wherein the method is performed by at least one processing device comprising a processor coupled to a memory.

2. The method of claim 1, wherein the aggregated query results are stored in a query store that is encrypted by the telemetry server.

3. The method of claim 1, further comprising providing the aggregated query results to one or more vendors.

4. The method of claim 1, wherein the at least one decryption key is obtained using a key identifier stored with the one or more encrypted payloads.

5. The method of claim 1, wherein the at least one telemetry client one or more of (i) validates the one or more decrypted payloads using one or more signatures within the one or more decrypted payloads, and (ii) evaluates a query type of the query to determine whether the at least one telemetry client opted in to the query type being executed.

6. The method of claim 1, wherein the at least one telemetry client anonymizes the query results to remove predefined sensitive information.

7. The method of claim 1, wherein the telemetry server anonymizes the query results to remove predefined source-specific information.

8. The method of claim 1, wherein the query is processed using client-side resources or server-side resources based on a data type of at least a portion of the one or more encrypted payloads.

9. A non-transitory processor-readable storage medium having stored therein program code of one or more software programs, wherein the program code when executed by at least one processing device causes the at least one processing device to perform the following steps:
   providing, by a telemetry server, a query request to one or more telemetry clients that collect telemetry data, wherein the provided query request comprises a query and one or more encrypted payloads of the query over which the query operates;
   obtaining a query result from one or more of the telemetry clients, wherein at least one of the telemetry clients processes the query request by performing the following steps: (a) decrypting the one or more encrypted payloads using at least one decryption key, (b) applying the query to the one or more decrypted payloads to generate the query result, and (c) providing the query result to the telemetry server; and
   aggregating the query results obtained from the one or more telemetry clients.

10. The non-transitory processor-readable storage medium of claim 9, wherein the aggregated query results are stored in a query store that is encrypted by the telemetry server.

11. The non-transitory processor-readable storage medium of claim 9, further comprising providing the aggregated query results to one or more vendors.

12. The non-transitory processor-readable storage medium of claim 9, wherein the at least one decryption key is obtained using a key identifier stored with the one or more encrypted payloads.

13. The non-transitory processor-readable storage medium of claim 9, wherein the at least one telemetry client one or more of (i) validates the one or more decrypted payloads using one or more signatures within the one or more decrypted payloads, and (ii) evaluates a query type of the query to determine whether the at least one telemetry client opted in to the query type being executed.

14. The non-transitory processor-readable storage medium of claim 9, wherein one or more of (i) the at least one telemetry client anonymizes the query results to remove predefined sensitive information, and (ii) the telemetry server anonymizes the query results to remove predefined source-specific information.

15. An apparatus comprising:
   at least one processing device comprising a processor coupled to a memory;
   the at least one processing device being configured to implement the following steps:
   providing, by a telemetry server, a query request to one or more telemetry clients that collect telemetry data, wherein the provided query request comprises a query and one or more encrypted payloads of the query over which the query operates;
   obtaining a query result from one or more of the telemetry clients, wherein at least one of the telemetry clients processes the query request by performing the following steps: (a) decrypting the one or more encrypted payloads using at least one decryption key, (b) applying the query to the one or more decrypted payloads to generate the query result, and (c) providing the query result to the telemetry server; and
   aggregating the query results obtained from the one or more telemetry clients.

16. The apparatus of claim 15, wherein the aggregated query results are stored in a query store that is encrypted by the telemetry server.

17. The apparatus of claim 15, further comprising providing the aggregated query results to one or more vendors.

18. The apparatus of claim 15, wherein the at least one decryption key is obtained using a key identifier stored with the one or more encrypted payloads.

19. The apparatus of claim 15, wherein the at least one telemetry client one or more of (i) validates the one or more decrypted payloads using one or more signatures within the one or more decrypted payloads, and (ii) evaluates a query type of the query to determine whether the at least one telemetry client opted in to the query type being executed.

20. The apparatus of claim 15, wherein one or more of (i) the at least one telemetry client anonymizes the query results to remove predefined sensitive information, and (ii) the telemetry server anonymizes the query results to remove predefined source-specific information.

* * * * *